(No Model.) 4 Sheets—Sheet 1.
V. W. MASON, Jr.
MILLING MACHINE.
No. 520,486. Patented May 29, 1894.
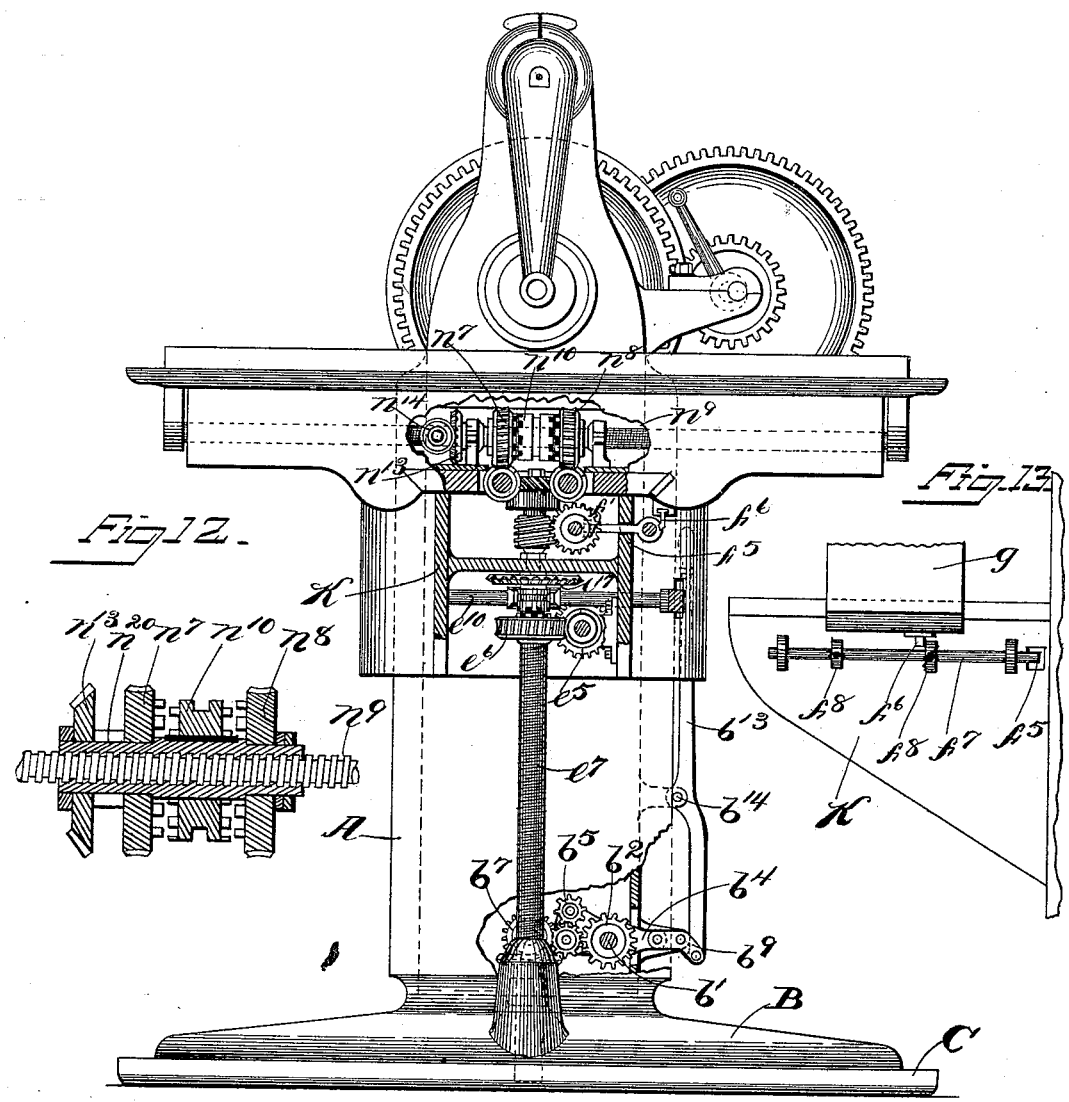
WITNESSES.
F. C. Noyes.
C. B. Crocker.
INVENTOR.
Volney W. Mason Jr.
by B. J. Noyes,
atty.

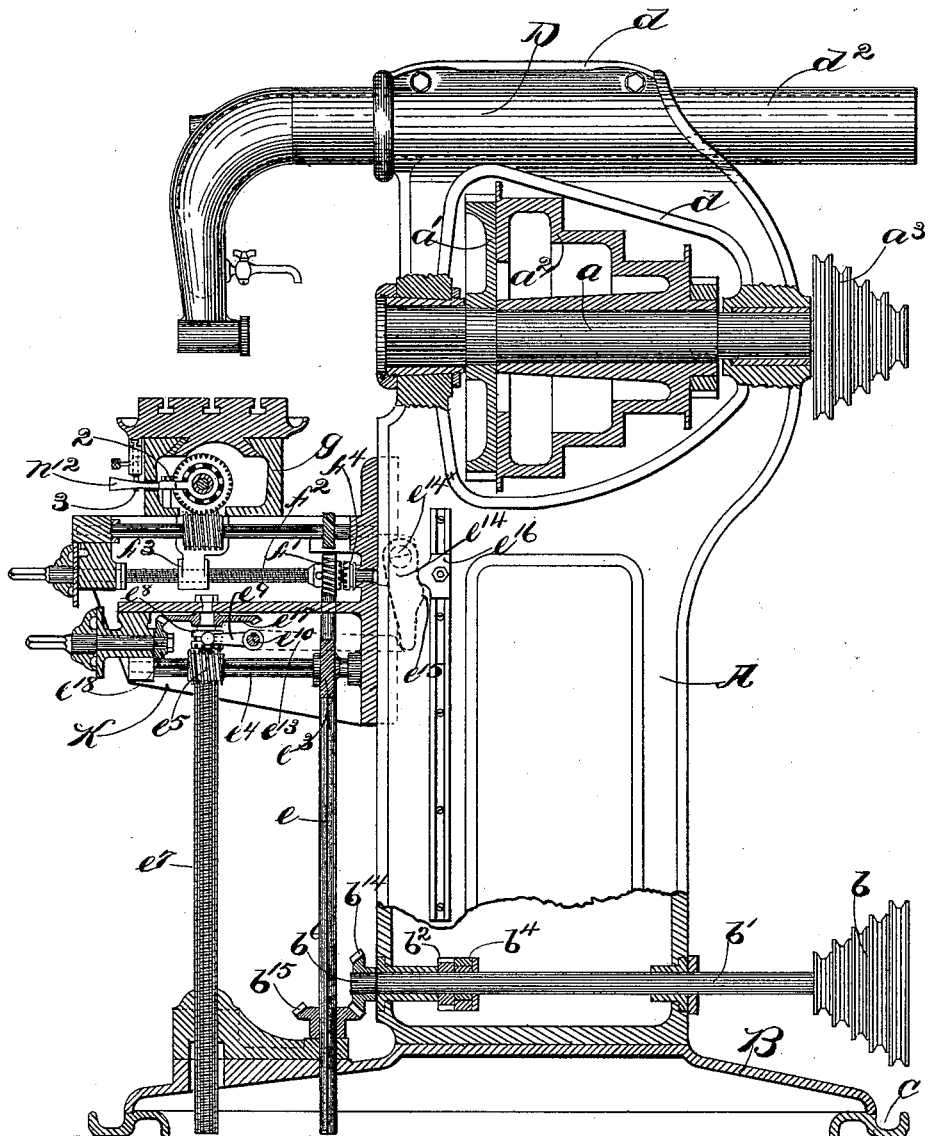

(No Model.) 4 Sheets—Sheet 3.
V. W. MASON, Jr.
MILLING MACHINE.
No. 520,486. Patented May 29, 1894.
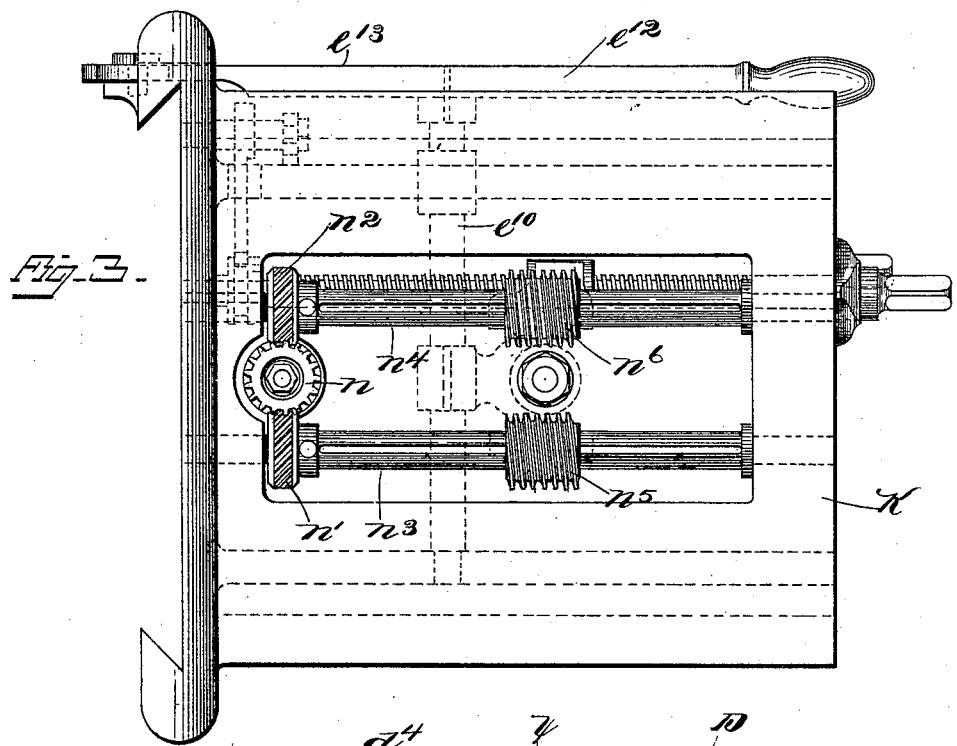
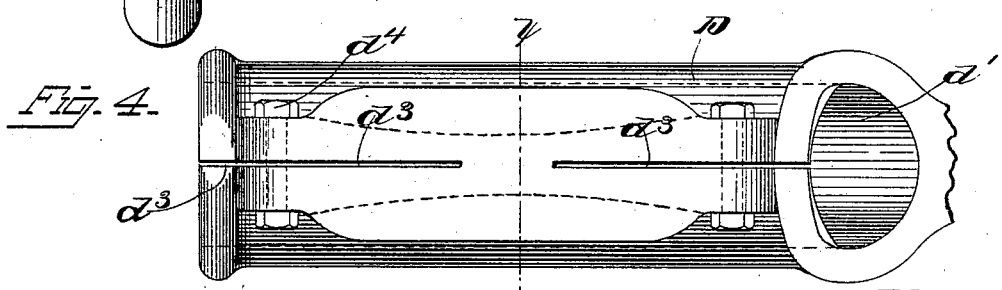
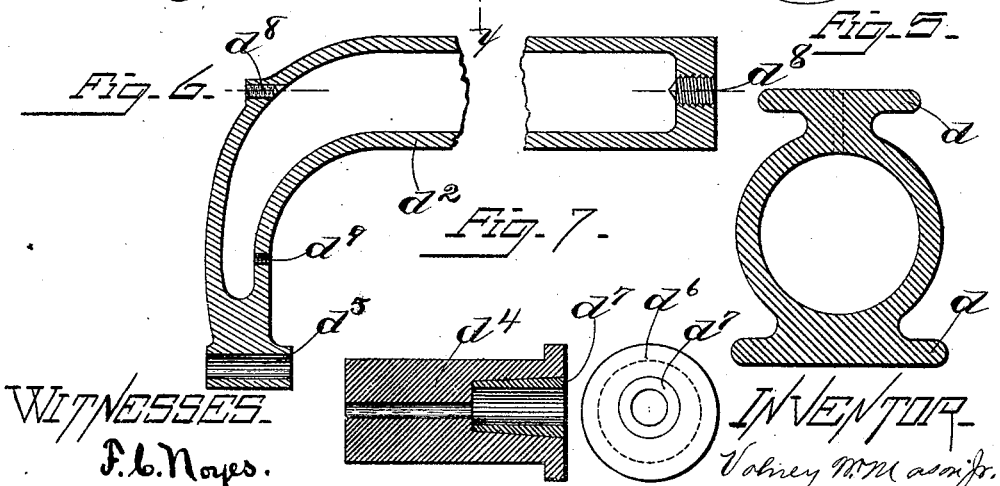
WITNESSES.
F. C. Noyes.
C. B. Crocker.
INVENTOR.
Volney W. Mason Jr.
by B. J. Noyes
atty.

(No Model.) 4 Sheets—Sheet 4.
V. W. MASON, Jr.
MILLING MACHINE.
No. 520,486. Patented May 29, 1894.
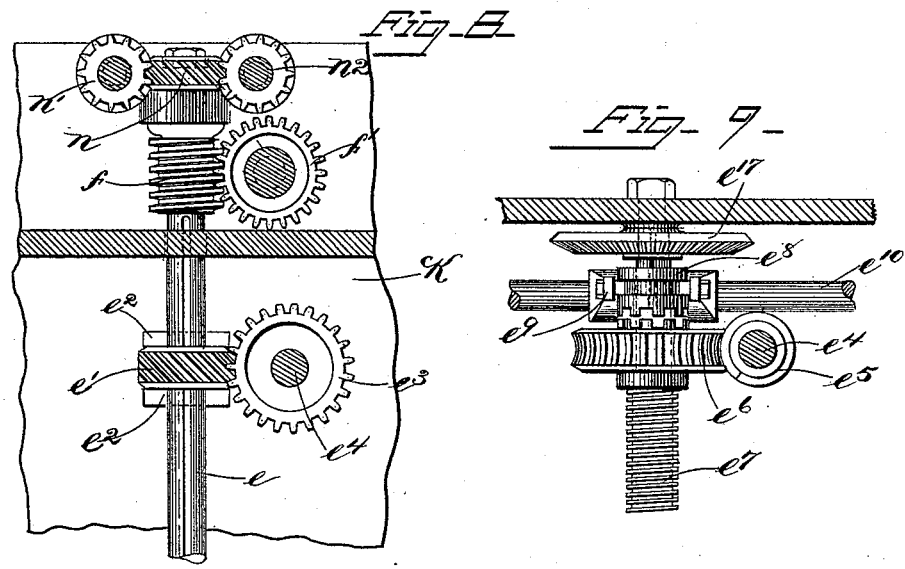
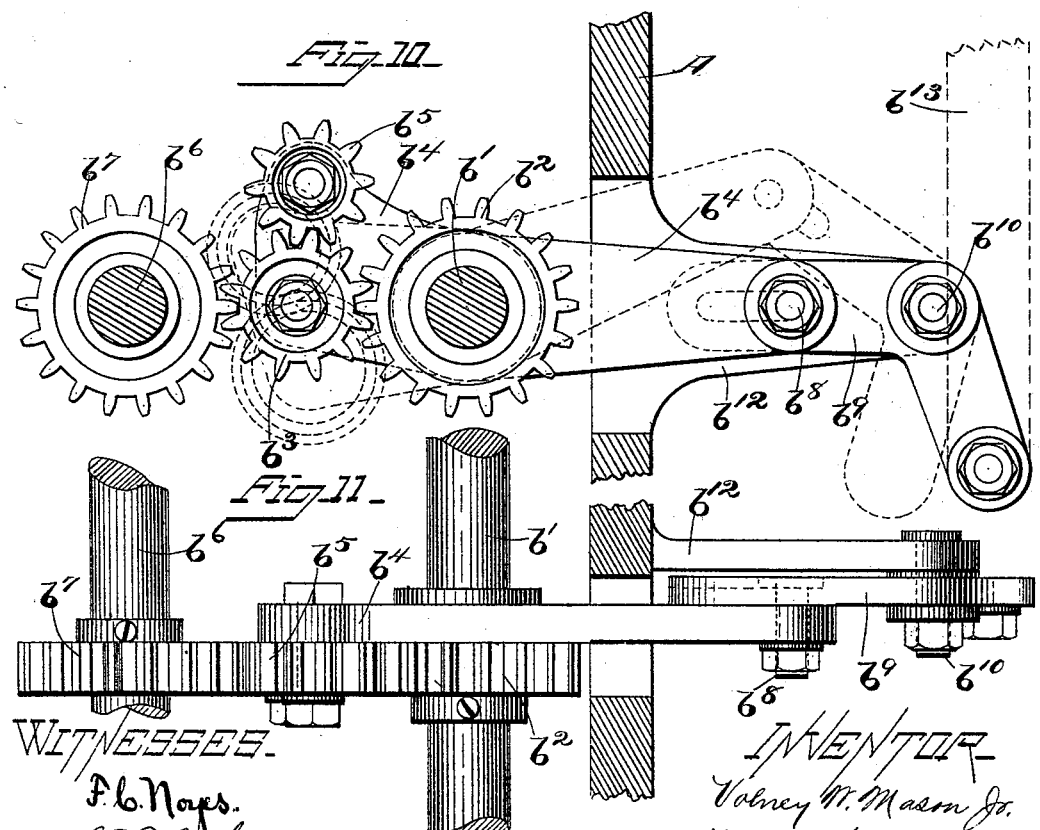
WITNESSES
F. C. Noyes.
C. B. Crocker.
INVENTOR
Volney W. Mason Jr.
by B. J. Noyes
atty ically the standard A, erected upon the base B,

UNITED STATES PATENT OFFICE.

VOLNEY W. MASON, JR., OF HYDE PARK, MASSACHUSETTS.

MILLING-MACHINE.

SPECIFICATION forming part of Letters Patent No. 520,486, dated May 29, 1894.

Application filed December 21, 1893. Serial No. 494,251. (No model.)

*To all whom it may concern:*

Be it known that I, VOLNEY W. MASON, Jr., of Hyde Park, county of Norfolk, State of Massachusetts, have invented an Improvement in Milling-Machines, of which the following description, in connection with the accompanying drawings, is a specification, like letters and figures on the drawings representing like parts.

This invention relates to universal milling machines, and has for its object to improve and simplify the construction of the feeding mechanism, whereby the table or work-holding plate may be automatically fed horizontally back and forth, or in and out, and also vertically; and furthermore my invention has for its object to improve and simplify other parts of the machine, increasing their efficiency; and the invention consists in many details of construction to be hereinafter pointed out and claimed.

Figure 1, shows in front elevation and partial section a milling machine embodying this invention; Fig. 2, a side elevation and partial section of the machine shown in Fig. 1; Fig. 3, a plan view of the knee, some of the parts being omitted for clearness, showing however the feed mechanism for the carriage; Fig. 4, an enlarged plan view of a portion of the arch of the framework, which affords a bearing for the sliding arm which supports the outer end of the tool-carrying arbor; Fig. 5, a cross section of said arch, taken on the dotted line $x$—$x$ Fig. 4; Fig. 6, a longitudinal section of the sliding arm; Fig. 7, details of the eccentric bushing in the sliding arm, which supports the tool-carrying arbor; Fig. 8, a detail showing the upper end of the prime mover with its gears and worm thereon, and the gears and worms with which they engage; Fig. 9, an enlarged detail of the clutch mechanism connected with the vertical feeding screw of the knee; Fig. 10, an enlarged side view of the reversing mechanism for the prime mover; Fig. 11, a plan view of said reversing mechanism; Figs. 12, 13, and 14, details to be referred to.

The main framework comprises essentially the standard A, erected upon the base B, which is herein represented as placed upon a supporting ring or frame C, of a shape to correspond with the shape of the base. The ring or frame C is made larger than the base B, and in that portion thereof which projects beyond said base a groove $c$ is formed which is designed to receive and hold any oil which may run down the main frame, or drop from any of the working parts of the machine. This grooved supporting ring or frame may be cast integral with the base if desired, and while especially desirable for milling machines, may be used in connection with other classes of machinery.

The tool-carrying shaft or arbor, not shown, is supported at one end by the main driving shaft or spindle $a$ upon which the usual spindle gear $a'$, and driving cone $a^2$, are supported, said shaft $a$ having its bearings in the standard A. The arch D at the top of the standard A is made cylindrical in cross section, or substantially so, see Fig. 5, and is provided above and below with flanges $d$ to increase the strength. The upper horizontal portion of said arch D, is bored longitudinally or otherwise provided with a hole $d'$ which receives the sliding arm $d^2$. The top of the arch which receives the sliding arm $d^2$, is slitted at each end as at $d^3$, and bolts $d^4$, or equivalent fastenings are provided which pass through ears or lugs at the opposite sides of said slits, for clamping the parts together, slightly contracting the arm-receiving hole or bearing to thereby securely embrace the sliding arm and hold it in whatever position it may be set. The sliding arm $d^2$, see Figs. 2 and 5, is bent or turned down at right angles at its forward end to provide a bearing for the outer end of the tool-carrying arbor. As herein shown the lower extremity of said arm has a hole $d^5$ in alignment with the axis of the driving shaft $a$, and a bushing $d^6$ see Fig. 7, is placed in said hole $d^5$, the inner face of which is reamed out or bored eccentrically to receive a bushing $d^7$ which receives and holds the outer end of the tool-carrying arbor. The bushing $d^7$, being slightly eccentric to the bushing $d^6$, permits said bushing $d^6$ to be turned to maintain the bushing $d^7$ in true alignment for the tool-carrying arbor in case the box or bearing of the driving shaft $a$, becomes worn, which would have a tendency to throw the parts out of alignment. The sliding arm $d^2$ is made hollow and closed at each end as represented in Fig. 5, although preferably cast in a single piece, and is provided at opposite ends of its horizontal portion with small apertures, which are closed by screws $d^8$, or otherwise. This hollow arm is adapted to receive and hold a large quantity of oil, admitted through either aperture, by removing its screw $d^8$, and near the lower end of its downwardly turned portion an outlet $d^9$ is provided, into which may be fitted any suitable delivering device as a cock for instance. The delivery of the oil may be regulated as desired according to the work being done. A cone pulley $a^3$, is secured to the rear end of the shaft $a$ over which a belt passes connecting it with a cone pulley $b$, secured to a shaft $b'$ having its bearings at or near the base of the machine. The shaft $b'$ has secured to it a toothed gear $b^2$, see Figs. 1, 10, and 11, which continuously engages a pinion $b^3$, loosely journaled to a quadrant or arm $b^4$, loosely mounted upon the shaft $b'$. Another pinion $b^5$ is journaled to said quadrant or arm $b^4$, which is engaged and driven continuously by said pinion $b^3$. A shaft $b^6$ is arranged in parallelism with the shaft $b'$ having its bearings in the base of the machine, like the shaft $b'$, and to said shaft $b^6$ a toothed gear $b^7$ is secured which is like the toothed gear $b^2$, and of substantially the same diameter, and the pinions $b^3$, or $b^5$, are in engagement with said toothed gear $b^7$, according to the position of the quadrant or arm $b^4$. By referring to Figs. 10, and 11, it will be seen that the pinion $b^3$ is in engagement with the gear $b^7$, and at such time the said gear will be rotated in the opposite direction to the gear $b^2$, but if the quadrant or arm $b^4$ is depressed and the pinion $b^5$ brought into engagement with the gear $b^7$, then in such case owing to the two intermediate pinions, the gear $b^7$ will be rotated in the same direction as the gear $b^2$. Thus it will be seen that by moving the quadrant or arm $b^4$ the shaft $b^6$ may be rotated in one or the other direction.

As a simple and effective means of moving the quadrant or arm $b^4$, I have extended it rearwardly beyond the shaft $b'$, and connected its rearmost extremity loosely by a pivot pin $b^8$ with one arm of a bell crank lever $b^9$ pivoted at $b^{10}$ to a lug or ear $b^{12}$ on the frame, and the other arm of said bell crank lever is connected to the lower end of an operating lever $b^{13}$ pivoted at $b^{14}$, to a lug or ear on the frame. By moving the operating lever $b^{13}$ in one, or the other direction, the direction of rotation of the shaft $b^6$ is thus reversed. A bevel gear $b^{14}$ is secured to the shaft $b^6$ which engages a bevel gear $b^{15}$, splined on the vertical prime mover $e$, which is the main operating shaft for the automatic feeding mechanism. The vertical prime mover $e$, has its bearings in the base B, and in the knee K, which latter is dovetailed onto the front of the standard A and hence movable vertically thereon. A spiral gear $e'$ is placed on the prime mover $e$, rotating with it, being held between two lugs $e^2$, on the interior of the knee, said gear engaging a spiral gear $e^3$ on a horizontal spline rod or shaft $e^4$, arranged at right angles to the prime mover $e$, and having its bearings in the knee. A worm $e^5$ is secured to said rod or shaft $e^4$, near its opposite end, which engages a worm wheel $e^6$ loosely mounted upon the vertical feeding screw $e^7$, at its upper end. The vertical feeding screw $e^7$ turns in the base B and is adapted to project down through a hole in the floor as the knee is lowered, like the prime mover $e$.

Upon the upper face of the worm wheel $e^6$, clutch teeth are formed, constituting a co-operative part of clutch mechanism, and a collar $e^8$ is splined on the upper end of the feeding screw $e^7$ which has upon its under side clutch teeth, adapted to engage the clutch teeth on the worm wheel $e^6$. A yoke $e^9$ is secured to a cross bar $e^{10}$ extending transversely to the knee and having its bearings therein, the arms of said yoke entering a circumferential groove formed in said collar $e^8$, so that by rocking said cross bar the clutch members may be brought into or out of engagement. A hand lever $e^{12}$, is connected with said rock shaft by means of which it may be rocked manually, and beneath said hand lever a cam lever $e^{12\times}$, is pivoted which may be operated by hand to move the lever $e^{12}$, in cases where it is difficult to move said lever $e^{12}$, manually. An arm $e^{13}$, see dotted lines Fig. 2, is secured to said rock shaft, projecting rearwardly, its rear end being beveled, and terminating adjacent a dog $e^{14}$, pivoted to the knee at $e^{14\times}$, and having a projection $e^{15}$, upon its rear edge. A limiting stop $e^{16}$, is adjustably fixed in a suitable vertical guideway in the frame, which projects into the path of movement of the dog $e^{14}$, so that as the knee upon rising or falling to a certain predetermined point at which the stop $e^{16}$ may be set, the projection $e^{15}$ will strike said stop $e^{16}$, and as it continues to rise or fall the dog is pressed so that its lower end acting upon the beveled end of the arm $e^{13}$, moves said arm, rocking the shaft $e^{10}$, raising the yoke and thereby separating the members of the clutch. The stop $e^{16}$, may be moved to any desired point of its guideway, and the projection $e^{15}$ on the dog is rounded in such a manner as to act upon the stop in a like manner, and with substantially the same result, whether the knee rises or falls. Thus it will be seen that by setting the stop $e^{16}$ at the desired point, as for instance near the upper end of the guideway, and lowering the knee as will be hereinafter described, and throwing into engagement the members of the clutch, said knee will automatically rise until the dog co-operates with the stop.

As a means for the quick return of the knee, which may be operated in either direction, I have fixed to the upper end of the feeding screw $e^7$ a bevel gear $e^{17}$, which is engaged by a bevel gear $e^{18}$, secured to a short shaft having its bearings in the front part of the knee, the outer end of said shaft being accessible, and squared to receive a wrench by means of which it may be rapidly turned when desired. The prime mover $e$ has also secured to it above the spiral gear $e'$, a worm $f$ which engages a worm wheel $f'$ loosely mounted upon a horizontal feeding screw $f^2$, having its bearings in the knee. A nut $f^3$ is mounted upon said feeding screw $f^2$ which is bolted to the carriage $g$ so that as the feeding screw is rotated in one or the other direction, the carriage will travel in and out.

A clutch mechanism is provided for the worm wheel $f'$ which is herein represented as clutch teeth formed upon the hub of said wheel, and a collar $f^4$ splined on the shaft $f^2$, and having upon its face clutch teeth adapted to be moved into and out of engagement with said toothed hub. A finger $f^5$ is formed upon the end of a bar $f^7$, sliding longitudinally in bearings on the side of the knee, said finger projecting inwardly through a hole in the knee, and entering the circumferential groove in said collar $f^4$. Two collars $f^8$ are adjustably secured to the bar $f^7$, which may be moved thereon at will. A tripping dog $f^6$ is supported on the carriage, see Figs. 1 and 13, which is adapted to engage either collar $f^8$, as the carriage travels, so as to move the bar $f^7$ and thereby disengage the clutch at the desired point. As the prime mover $e$, continuously rotates in one or the other direction, according to the position of the co-operative parts of the reversing mechanism, the worm $f$ thereon will be continuously rotated, thereby continuously rotating the worm wheel $f'$, and when the clutch is thrown into engagement with said worm wheel, the feeding screw $f^2$ will be rotated, thereby moving the carriage $g$ on the knee, in or out. The outer end of the feeding screw $f^2$, projects through the front of the knee and is squared to receive a wrench by which it may be turned quickly by hand whenever desired. A spiral gear $n$ is also secured to said prime mover $e$, above the worm $f$, see Figs. 1, 3, and 8, which engages two spiral gears $n'$, $n^2$, secured to parallel horizontal shafts $n^3$, $n^4$, having their bearings in the knee, and upon said shafts $n^3$, $n^4$, worms $n^5$, $n^6$, are placed, held in position thereon by recesses formed in the under side of the carriage made to receive them. The shafts $n^3$, $n^4$, are thus driven in opposite directions. The worms $n^5$, $n^6$, respectively engage worm wheels $n^7$, $n^8$, see Figs. 1 and 12, loosely mounted upon a cylindrical nut $n^{20}$, on a horizontal feeding screw $n^9$, connected to the table, and upon the adjacent faces of said worm wheels $n^7$, $n^8$, clutch teeth are formed, and between said worm wheels a collar $n^{10}$ is splined on the nut $n^{20}$ having at each end clutch teeth, so that as said collar is moved in one or the other direction, it will be brought into engagement with one or the other worm wheel, and during such engagement the collar and hence the nut upon which it is splined will be rotated, in turn positively driving the feeding screw, and thereby automatically feeding the table in one or the other direction. A lever, see Fig. 2, pivoted at 2, to a stud within the carriage engages the intermediate collar $n^{10}$, and said lever projects outwardly through the front of said carriage and is provided with a handle by means of which it is swung on its pivot to throw the collar to the right or to the left. A tripping dog 3 is adjustably secured to the table which as said table travels strikes said lever $n^{12}$, to disengage the clutch. By means of this mechanism it will be seen that the table is automatically fed in one or the other direction according to which worm wheel $n^7$ or $n^8$ is employed as the driver. A bevel gear $n^{13}$, is secured to said nut $n^{20}$ which is engaged by a bevel gear $n^{14}$, secured to a short shaft having a squared end to receive a wrench by means of which it may be rotated as desired to adjust the table manually.

I claim—

1. In a milling machine, an arm which supports the outer end of the tool-carrying arbor, provided interiorly with an oil reservoir, and an outlet for the oil near the lower end of said arm adjacent the work being done, substantially as described.

2. In a milling machine, an arm which supports the outer end of the tool-carrying arbor, provided interiorly with an oil reservoir, an outlet therefor, and a delivering device controlling the delivery of oil, substantially as described.

3. In a milling machine, a bent arm which supports the outer end of the tool-carrying arbor, made hollow to receive a quantity of oil, an inlet for the oil at the horizontal portion of said arm, and an outlet for the oil near the lower end of its downwardly turned portion, and a delivering device at said outlet, substantially as described.

4. In a milling machine, the combination of a prime mover, and means for rotating it, spiral gear $e'$ thereon, a rising and falling knee, shaft $e^4$ having its bearings in said knee, and bearing a spiral gear $e^3$, which is engaged and driven by the aforesaid spiral gear $e'$, a worm on said shaft $e^4$, a worm wheel, engaged and driven by it, a feeding screw upon which said worm wheel is loosely mounted bearing upon its face a series of clutch-teeth, a sliding collar splined on said feeding screw bearing upon its face a series of clutch teeth, and means for operating said collar both automatically and manually, substantially as described.

5. In a milling machine, the combination of a prime mover, and means for rotating it, a rising and falling knee, a vertical feeding screw therefor, gearing connecting said feeding screw with said prime mover, and clutch mechanism therefor, having as a cooperative part of it a yoke $e^9$, rock shaft $e^{10}$, rearwardly extended arm $e^{13}$, with beveled end, dog $e^{14}$, with projection $e^{15}$, and the adjustable stop $e^{16}$, substantially as described.

6. In a milling machine, the combination of a prime mover, and means for rotating it, a rising and falling knee, a vertical feeding screw therefor, gearing connecting said feeding screw with said prime mover, a clutch mechanism for said gearing, a releasing lever for said clutch mechanism, and a stop on the frame work with which said lever cooperates, adjustable vertically for a distance corresponding to the full travel of the knee, whereby the clutch mechanism may be automatically disengaged at any point in the travel of the knee corresponding to the position of said stop, substantially as described.

7. In a milling machine, the combination of a prime mover, and means for rotating it, a rising and falling knee, a vertical feeding screw, therefor, gearing connecting said feeding screw with said prime mover, a clutch mechanism for said gearing, a yoke $e^9$ engaging one member of said clutch mechanism, rock shaft $e^{10}$ supporting it, and a hand lever secured to said rock shaft by means of which it may be rocked, substantially as described.

8. In a milling machine, the combination of a prime mover, and means for rotating it, a rising and falling knee, a vertical feeding screw, therefor, gearing connecting said feeding screw with said prime mover, a clutch mechanism for said gearing, an operating lever for said clutch mechanism and a hand operated cam lever for moving it, substantially as described.

9. In a milling machine, the combination of a vertical prime mover, and means for rotating it by power, a knee and carriage thereon, a horizontal feeding screw for said carriage, and nut thereon connected with said carriage, and a pair of gears directly connecting said feeding screw with said vertical power driven prime mover, substantially as described.

10. In a milling machine, the combination of a vertical prime mover, and means for rotating it by power, a knee and carriage thereon, a horizontal feeding screw for said carriage and nut thereon connected with said carriage, and a pair of gears connecting said feeding screw with said vertical power driven prime mover and clutch mechanism cooperating with one of said gears to connect it with its shaft, and an adjustable tripping dog therefor for limiting the travel of the bed in either direction, substantially as described.

11. In a milling machine, the combination of a prime mover, and means for rotating it, a table and horizontal feeding screw therefor, two worm wheels loosely mounted upon a nut on said feeding screw, an intermediate clutch splined on said nut, and means for operating it, two worms engaging said worm wheels, shafts therefor, and gears on said shafts connecting them with a gear on the prime mover, substantially as described.

12. In a milling machine, the combination of a prime mover, and means for rotating it, a table and horizontal feeding screw therefor, a nut on said feeding screw, and two loose worm wheels, and clutch mechanism for engaging said nut with either worm wheel, two oppositely rotating shafts connected with said prime mover by gearing and bearing worms in continuous engagement with said worm wheels, an operating lever for said clutch mechanism, and a tripping dog for said operating lever, substantially as described.

13. In a milling machine, the combination of a vertical prime mover, movable in a splineway, and driven by power, and bearing three gears one above the other, reversing mechanism therefor, a vertically moving knee, and feeding screw therefor connected with the lowermost gear on the prime mover, and an intermediate clutch mechanism, a horizontally movable carriage on said knee, a horizontal feeding screw therefor connected with the uppermost gear on said prime mover, and an intermediate clutch therefor, and adjustable tripping dogs for said knee and carriage and table, all substantially as described.

In testimony whereof I have signed my name to this specification in the presence of two subscribing witnesses.

VOLNEY W. MASON, JR.

Witnesses:
B. J. NOYES,
C. B. CROCKER.